United States Patent [19]

Kawabata

[11] Patent Number: 4,926,728
[45] Date of Patent: May 22, 1990

[54] BAND SAW FOR CUTTING SHAPED PIECES OF BAR STOCK

[75] Inventor: James Kawabata, Niles, Ill.

[73] Assignee: Contour Saws, Inc., Des Plaines, Ill.

[21] Appl. No.: 316,984

[22] Filed: Feb. 28, 1989

Related U.S. Application Data

[63] Continuation of Ser. No. 904,157, Sep. 5, 1986, abandoned.

[51] Int. Cl.[5] .................. B23D 53/08; B23D 55/04; B23D 55/08; B26D 13/10
[52] U.S. Cl. ........................................ 83/251; 83/270; 83/277; 83/409.2; 83/452; 83/789; 83/794; 83/801; 83/810; 269/34; 269/172
[58] Field of Search ................ 83/13, 34–36, 83/789, 810–812, 801, 270, 820, 732, 733, 708, 409, 409.2, 410, 435.1, 871, 874, 251, 277, 581, 414; 269/61, 63, 65, 73, 296, 24, 172; 409/174, 221, 222, 224; 29/33 T; 279/5, 41 R, 41 A, 52, 42

[56] References Cited

U.S. PATENT DOCUMENTS

| | | | |
|---|---|---|---|
| 2,774,131 | 12/1956 | Crane | 83/797 |
| 3,259,155 | 7/1966 | Kawabata | 83/820 |
| 3,908,723 | 9/1975 | Hill | 83/789 |
| 4,179,966 | 12/1979 | Ginnow et al. | 83/820 |
| 4,574,670 | 3/1986 | Johnson | 83/409 |

FOREIGN PATENT DOCUMENTS

WO/00915 3/1984 PCT Int'l Appl. .................. 29/568

Primary Examiner—Hien H. Phan
Attorney, Agent, or Firm—Dean A. Monco

[57] ABSTRACT

The present invention relates to a band saw machine having the capability to produce finished piece parts by employing a rotatable collet and an index vise to rotate and longitudinally position the piece part, a band saw blade positioned in a blade twist assembly capable of making straight, angular, and arcuate cuts on the work piece, and a motor means to move the saw blade perpendicular to the work piece, all under the direction of a pre-programmed computer control.

8 Claims, 10 Drawing Sheets

BAND SAW FOR CUTTING SHAPED PIECES OF BAR STOCK

This is a continuation application of co-pending application Ser. No. 904,157 filed on Sept. 5, 1986 now abandoned.

FIELD OF THE INVENTION

This invention relates to an industrial grade band saw capable of cutting non-ferrous and ferrous stock, and more particularly, to an improved band saw capable of making multiple intricate cuts along the surface of the bar stock.

BACKGROUND OF THE INVENTION

Industrial band saws have been used for decades to cut non-ferrous and ferrous bar stock. Typically, the bar stock would be indexed along a conveyor line to an appropriate length, and the band saw would make a complete cut perpendicular to the longitudinal axis of the bar stock. This type of cut would be made repeatedly to produce as many pieces as desired.

Prior to the present invention, band saws were not used to make intricate cuts on non-ferrous and ferrous bar stock for several reasons. First, the relative movement between the saw blade and the work was limited to a single planar path. Second, no means was provided for precisely rotating the bar stock or limiting the depth of the cuts made to produce more than one cut on any one indexed section of the bar. Third, no mechanism was known to enable the band saw to make repeated fine cuts perpendicular to, parallel to, or at an angle to the longitudinal axis of the bar stock. Specifically, such types of intricate cuts were made on milling machines requiring a much longer period of time to complete the cuts.

SUMMARY OF THE INVENTION

This invention relates to a band saw capable of making repeated intricate cuts perpendicular to, parallel to and/or at an angle to the longitudinal axis of bar stock being fed into the band saw. These cuts can be made repeatedly by the band saw on individual indexed pieces of bar stock. With this capability, the present invention is able to produce non-ferrous or ferrous finished pieces of varying configurations previously only producable on milling machines.

The present invention comprises an industrial designed band saw which is controlled by a computer having the capability of being pre-programmed so as to control numerous functions of the band saw machine to produce the cuts desired.

The band saw machine is comprised of a continuous saw blade positioned with a 180° contact on each of a pair of rotating wheels and driven by a drive motor. The back of the blade rests against a wheel flange. The bar stock is held in place by means of an adjustable chuck or collet. Additionally, an index vise operated by a short stroke air cylinder holds the bar stock from moving as it is advanced through the chuck or collet. When a longitudinal indexing movement is required, the collet is opened, and the index vise jaws are engaged against the sides of the bar. The chuck or collet assembly is then moved relative to the bar stock and stopped when the desired length is indexed through said chuck or collet. This same collet or chuck can also be used to hold single pieces such as castings or forgings or individual cut off lengths of stock.

The invention also provides for the motorized rotation of the bar to accomplish the sawing of the aforementioned finished pieces. A servo motor provides motive power for rotation. When rotation is desired, the index vise is open while the collet is closed. A shaft having a worm is rotated by the servo motor. The worm connects with a corresponding worm gear positioned on the outside of the collet. The rotation of the worm gear rotates the collet which in turn rotates the bar stock to the desired angular position. This function is controlled by the pre-programmed computer.

Perpendicular cuts may be made in the bar stock by means of an X-axis servo motor which will move the sawhead assembly on a rail to the bar stock. To make cuts parallel to the longitudinal axis of the bar stock, a blade twist servo motor is engaged to rotate the saw blade through an arc of 90°. The bar stock is then advanced forward into contact with the saw blade by means of a Y-axis servo motor. Both servo motors may be engaged simultaneously to position both the saw head and the bar to make cuts at various angles to the longitudinal axis of the bar stock. Additionally, by combining the rotational movement of the bar stock with the angular positioning of the saw blade, together with the X and Y movements, the band saw has the capability of making straight or angular cuts anywhere on the cylindrical or flat surfaces of the bar and at any rotational position of the bar from 0° to 360°, and also making a helical cut.

The saw blade is positioned between two canted rollers which, together with upper and lower blade guides, control the lateral movement of the saw blade as the blade is cutting the bar stock and as it is being withdrawn from partial cuts. A servo motor is connected to the blade by means of a series of belts and pulleys which will precisely control the angular positioning of the blade against the car stock. The servo motor is under the control of the pre-programmed computer so that these angular cuts may be made repeatedly with no operator assistance.

It is further evident that by the nature of the provisions for the X-Y coordinate movements for bar or piece part rotation, and for saw blade rotation, that successive cuts can be made on a piece part or on a section of a bar without unclamping and moving the piece part or the bar and reclamping it in a new position. This capability provides efficient cutting operations at any angle, as well as increasing the accuracy of the finished cut part.

It is an object of the present invention to have a band saw capable of making repeated cuts horizontally to, parallel to, or angularly disposed to a longitudinal axis of a piece of bar stock.

It is another object of this invention to have a band saw having means capable of indexing and rotating a piece of bar stock so as to enable the band saw to produce straight or angular cuts on the bar stock at any location around and along the bar.

It is still another object of this invention to design a band saw having a means for rotating a saw blade in an arc of 90° or more so as to produce straight or angular cuts on the surface of the bar stock.

It is still another object of the present invention to design a band saw having the capacity to withdraw the saw blade from the cut surface of the bar stock before the band saw blade makes another cut.

Another object of this invention to have the pre-programmed computer capable of controlling the rotational and longitudinal movement of the bar stock and operating the band saw in such a manner so as to produce combinations of cuts having various angles and lengths and to repetitiously produce finished or semi-finished piece parts without human intervention.

Still another object is to provide a means to shape individual pieces such as forgings or castings or pre-cut lengths into finished or semi-finished piece parts.

DESCRIPTION OF THE PREFERRED EMBODIMENT

Figure 1:
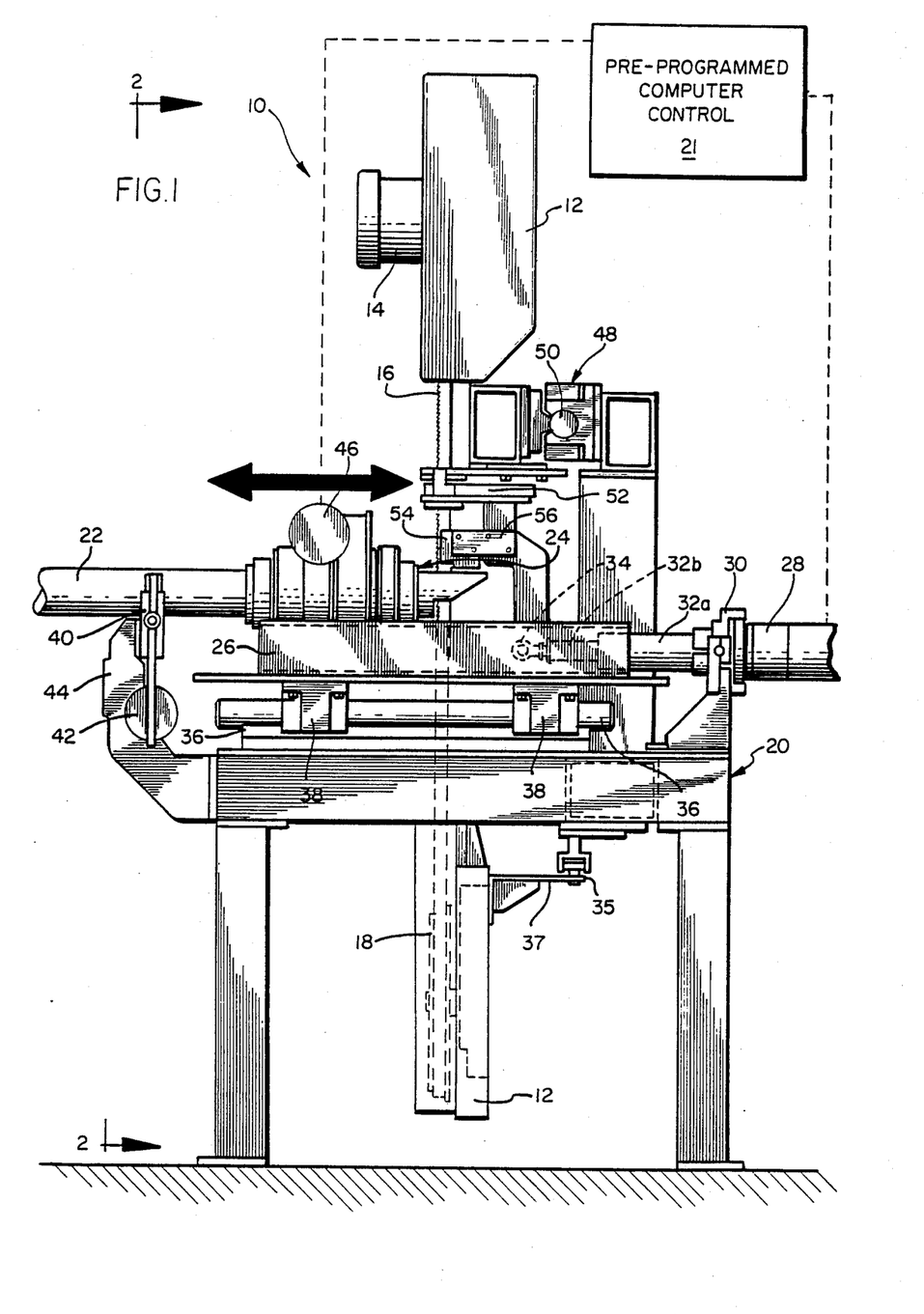
FIG. 1 is a side view of the band saw machine according to the present invention.

Referring to the drawings, FIG. 1 shows a band saw machine 10 having a saw head assembly 12 mounted to the upper part of the machine, and a drive motor 14 affixed to the saw head and used to provide the power to rotate a continuous flexible band saw blade 16 in an oval rotation. The band saw blade 16 is positioned on a pair of pulley wheels, the first pulley wheel being positioned in the upper portion of the saw head assembly and a second pulley wheel 18 mounted to the lower portion of the saw head assembly 12. A frame 20 provides a mounting base for the various components of the complete machine.

An individual piece part or workpiece or bar stock 22 is fed longitudinally to the band saw machine 10. The bar stock 22 is inserted into and secured by means of a collet assembly 24 having the capability to open and close around the circumference of the bar stock 22. The collet 24 is mounted to a Y-axis support assembly 26 affixed to the frame 20 of the band saw machine 10.

A pre-programmed computer control 21 is positioned in close proximity to the band saw machine 10, and is programmed to control the cutting process as is explained below.

The pre-programmed computer control 21 is a multi-axis numerical controller which directs linear movement along an X axis and a Y axis, rotational movement of the bar stock 22, and the rotational movement of a blade twist assembly in accordance with a desired program inputted by a programmer to cut the desired shape. This could include linear and circular interpolation for cutting angles and arcs, respectively. An example of such a unit is the Dyna Path System 20M CNC Simultaneous ¾ Axis Control unit manufactured by Dyna Path Systems, Inc.

For purposes of this specification, reference to "X" or "X-axis" means an orientation generally perpendicular to the longitudinal axis of the bar stock 22. Reference to "Y" or "Y-axis" means an orientation generally parallel to the longitudinal axis of the bar stock 22.

Longitudinal indexing of the bar stock 22 is accomplished as follows. The computer 21 is connected to a Y-axis servo motor 28 which is attached to and connected with a ball screw actuator housing 32a having an extension rod 32b and a clevis 34 affixed at the end of extension rod 32b. The actuator housing rod 32a and the extension rod 32b are positioned within the Y-axis support assembly 26. The Y-axis support assembly 26 is in turn mounted on a Y-axis rail 36 by means of a pair of pillow blocks 38. The actuator housing 32a is mounted to frame 20 by means of a gimbal 30.

When longitudinal indexing is desired, the collet 24 is opened and an index vise 40 having a short stroke air cylinder 42 is engaged. The index vise 40, secured to a support bracket 44 mounted on the frame 20, is then secured around the bar stock 22. The Y-axis servo motor 28 is then engaged by the computer 21, causing movement of the extension rod 32b in the direction of the saw blade 16. The movement occurs along the Y-axis rail 36. When the desired position is reached, the index vise 40 is disengaged and the collet 24 is engaged to secure the bar stock 22 firmly in place.

Rotation of the bar stock 22 is achieved by means of a rotational servo motor 46 connected to the computer 21 and acting on the collet 24. Through means of a worm and worm gear (not show in this view), the servo motor 46 will rotate the collet 24 and the bar stock 22 to the desired position.

The saw head assembly 12 moves in an X-axis direction in a manner similar to that of the longitudinal indexing of the bar stock 22. That is, the saw head assembly 12 is affixed to the linear ball bearing pillow block 48 and linear rail assembly 50. A roller support 35, affixed to a flange 37 mounted on sawhead 12, acts in conjunction with a linear ball bearing pillow block 48 to control movement of the saw head assembly 12, when in motion.

When movement is desired, an X-axis servo motor (not shown in this view), connected to the pre-programmed computer 21, is engaged, causing movement of the saw head assembly 12 in a perpendicular direction to the longitudinal axis of the bar stock 22. The saw head assembly 12 may be moved into and out of the bar stock 22 repeatedly to make cuts either greater than or less than the diameter of the bar stock 22, as dictated by the computer 21.

The saw blade 16 can also be pivoted around a limited arc so as to provide angular cuts to the longitudinal or transverse axis of the bar stock 22 as desired. A saw blade 16 is rotated by a blade twisting assembly 52 mounted to the sawhead assembly 12 of the band saw machine 10. An upper blade guide 54a and a lower blade guide (not shown in this view), mounted to a support member 56, prevents lateral movement of the saw blade 16. The blade guides 54 act as a resistance to the forces exerted by the blade 16 against the surface of the bar stock 22 when it is cutting or when it is being withdrawn from the cut. The blade twist assembly 52 can rotate the saw blade at an arc of 90° or more.

When angular cuts are required, a coordinated positioning of the bar stock is achieved by the computer control 21 which is programmed to operate the Y-axis servo motor 28, the rotational servo motor 46, X-axis servo motor and the motorized blade twist assembly 52. A particular length of bar stock 22 is indexed by the Y-axis servo motor 28 in conjunction with the index vise 40. The saw blade 16 is then positioned by the blade twist assembly 52 at an angle from 0° to 90° of the longitudinal axis of the bar stock 22. The saw blade 16 is then moved into the bar stock 22, either making a complete cut or a partial cut. If a series of angular cuts are desired, the Y-axis servo motor will move the bar stock 22 into the saw blade 16 repeatedly along the rail 36, while the X-axis servo motor will move the saw head 12 in a direction perpendicular to the longitudinal axis of the bar stock 22. This process is repeated until the desired number of cuts are achieved. The bar stock 22 may be rotated to locate the cuts anywhere around the 360° circumferential surface of the bar. All of these movements are coordinated by the computer control 21.

Figure 2:
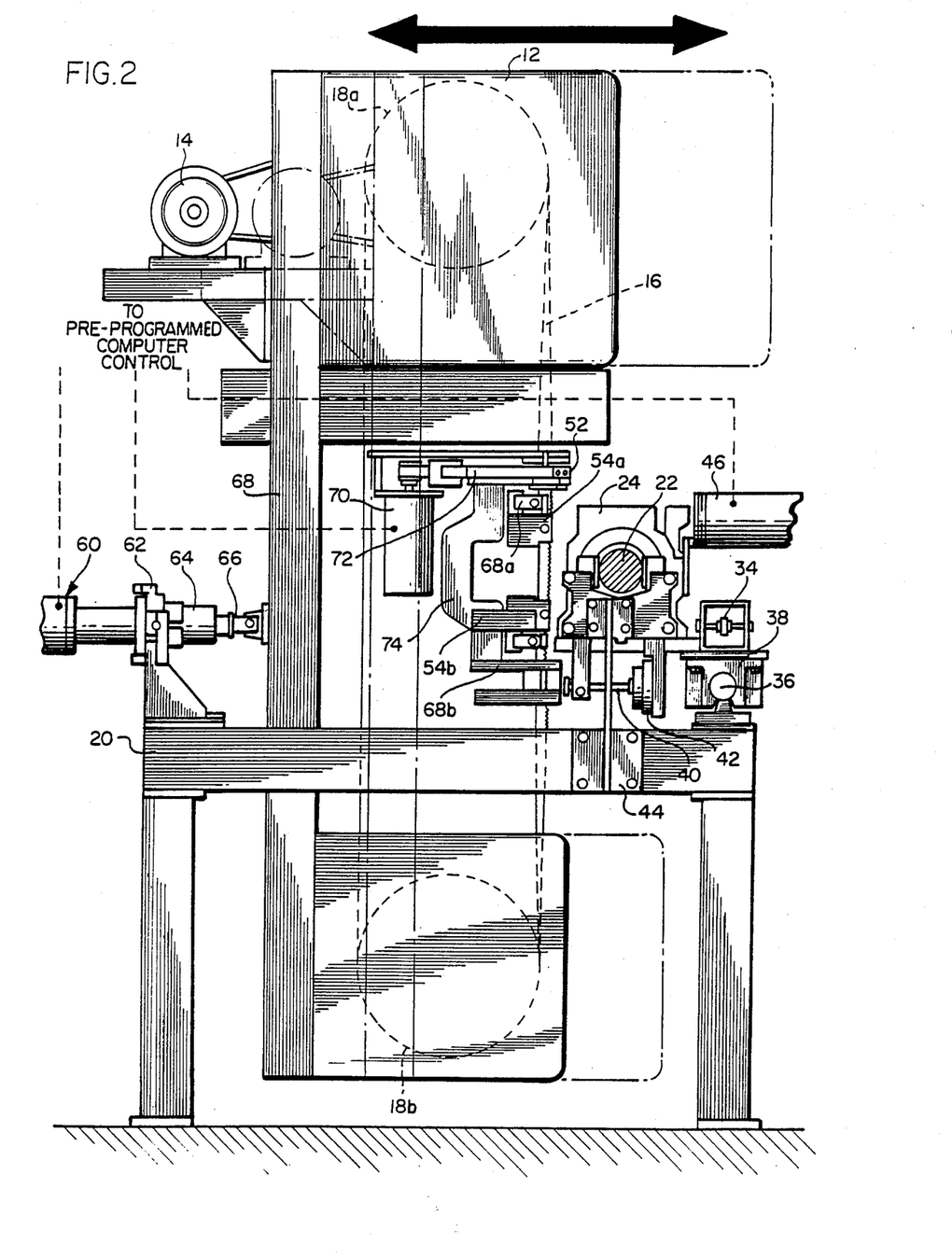
FIG. 2 is a cross-sectional view of the band saw machine taken along lines 2—2 of FIG. 1.

Cuts made along the X-axis by means of movement of the saw head assembly 12 are shown in FIG. 2. A saw blade motor 14 engages pulley wheel 18a, resulting in the rotational movement of the band saw blade 16 around the pulley wheels 18a, 18b, as is commonly known in the art.

When a cut generally perpendicular to the longitudinal axis bar stock 22 is desired, an X-axis servo motor 60 is engaged by the computer control 21. The X-axis servo motor 60, mounted to the band saw machine frame 20 by means of a gimbal 62 and an actuator housing 64, has an extension rod 66 affixed to a frame assembly 68 of the saw head assembly 12, and moves the entire saw head assembly 12 along the X-axis linear rail 50 into the bar stock 22. The cut is made to the depth determined by the computer control 21, and then the saw head assembly 12 is moved back along the X-axis linear rail 50.

Angular bar cuts are made in the bar stock 22 as follows. The saw blade 16 is positioned between the upper blade guide 54a and a lower blade guide 54b. The upper blade guide 54a and the lower blade guide 54b servo to maintain the saw blade 16 in the intended position during the cutting process. Canted rollers 68a, 68b are positioned on either side of the saw blade 16 and are used for the purpose of pulling the saw blade back between upper guides 54a and lower guides 54b. The canted rollers 68a, 68b serve to counteract forces exerted on the saw blade in a direction out of the blade guides when partial cuts are made.

A blade twist servo motor 70, under the command of computer control 21, is connected to the blade twisting assembly 52 by means of a tooth belt 72. When an angular cut is desired, the blade twist assembly 52, together with yoke 74 which is part of assembly 52, can be rotated through an arc of 90° or more as desired. Once the proper angle of the band saw blade 16 is achieved, the X-axis servo motor 60 may be engaged to move the saw head assembly 12 so that the band saw blade 16 is moved into the bar stock 22 to the desired depth.

Figure 3:
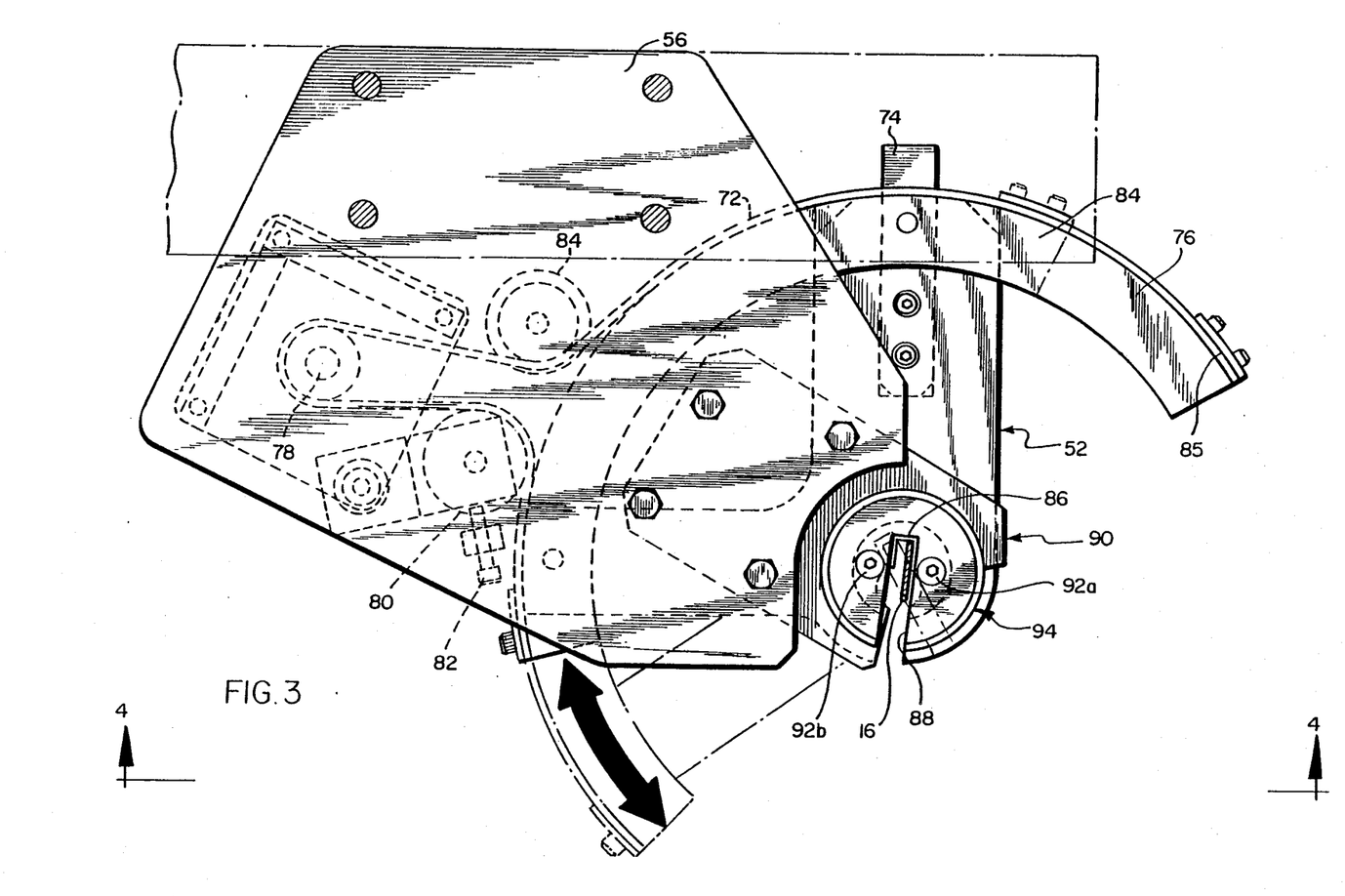
FIG. 3 is an enlarged schematic view of the apparatus for positioning the band saw blade.

FIG. 3 illustrates the rotational movement of the saw blade 16. The tooth belt 72 extends around a gear segment 76 and around a belt pulley 78. An adjustable idler 80 removes any slack developing in the belt by means of an idler adjusting screw 82. A second idler 84 maintains contact of toothed belt 72 against gear segment 76. The toothed belt is held in position by a series of belt clamps 85.

The blade twist assembly 52 is supported by means of an end cap 86 secured with screws 92a and 92b to the end of a slotted pivot shaft 88 into which the saw blade 16 is inserted. The weight of the blade twist assembly 52 is counteracted by end cap 86 bearing against thrust bearing 94 which is supported by bracket 90. The upper pivot bearing assembly provides the means for rotating the blade twist assembly 52 to position the saw blade 16 in the desired location.

Figures 4, 5:
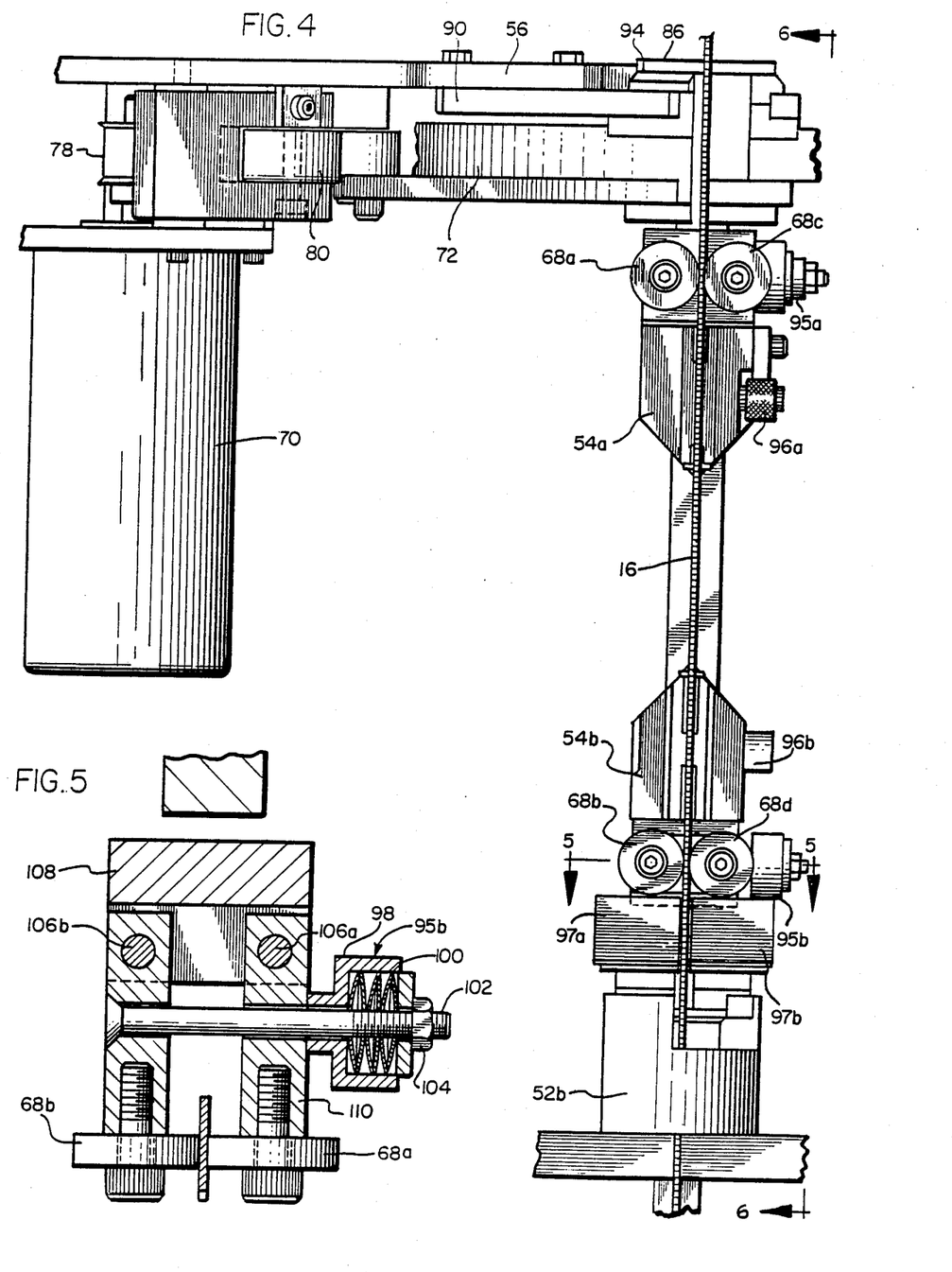
FIG. 4 is a cross-sectional view of the band saw blade positioning apparatus taken along lines 4—4 of FIG. 3.
FIG. 5 is a cross-sectional view of the canted rollers taken along lines 5—5 of FIG. 4.

FIG. 4 illustrates the mechanism for keeping the band saw 16 in proper alignment. Canted rollers 68a, 68b, 68c, 68d are positioned on either side of the band saw blade 16. The canted rollers 68a, 68b, 68c, 68d are slightly tilted and are spring loaded against the side of the saw blade 16 by means of a pair of spring loaded screw assemblies 95a, 95b mounted to roller brackets. As the saw blade 16 travels through the canted rollers 68a, 68b, 68c, 68d, it is pulled backwards into blade guides 54a and 54b. This pulling action is needed to resist an opposite pull on the saw blade 16 when it is being backed out of a partial cut in the bar stock 22. The sides of the cut bar stock 22 rub against the teeth of the saw blade 16 and pull it in a continuing movement along the line of the cut. This force must be resisted in order to prevent the blade from being pulled out of the blade guides 54a, 54b.

Adjustable loaded tension screws 96a, 96b are inserted into the upper and lower blade guides 54a, 54b and are used to put a load on the saw blade 16 in order to keep it in proper alignment. Lateral forces will be exerted on the saw blade 16 as it enters and cuts the bar stock 22. By means of the tension screws 96a, 96b and the upper and lower blade guides 54a, 54b, these forces are resisted and the blade 16 maintains a generally proper alignment.

A pair of chip deflectors 97a, 97b are positioned on either side of the saw blade 16 and beneath the canted rollers 68b, 68d for the purpose of preventing any metal shards from the bar stock 22 from jamming the band saw blade 16.

The spring load screw assembly 95b shown in FIG. 5 comprises an outer casing 98, spring washers 100, a threaded adjusting screw and shaft 102 and an adjusting nut 104. Two pivot pins 106a, 106b, mounted to a pivot bracket 108 provide the means for tilting the canted rollers 68a, 68b. The force exerted on the blade 16 by the canted rollers 68a, 68b may be adjusted by the adjusting nut 104 moving up or down the threaded screw 102 as desired. The canted rollers 68a, 68b, mounted to a roller bracket 110 by means of a pair of screws 112a, 112b will then exert the proper force against the side face of the saw blade to resist the pulling force exerted on the saw blade 16 while being withdrawn from a partial cut.

Figure 6:
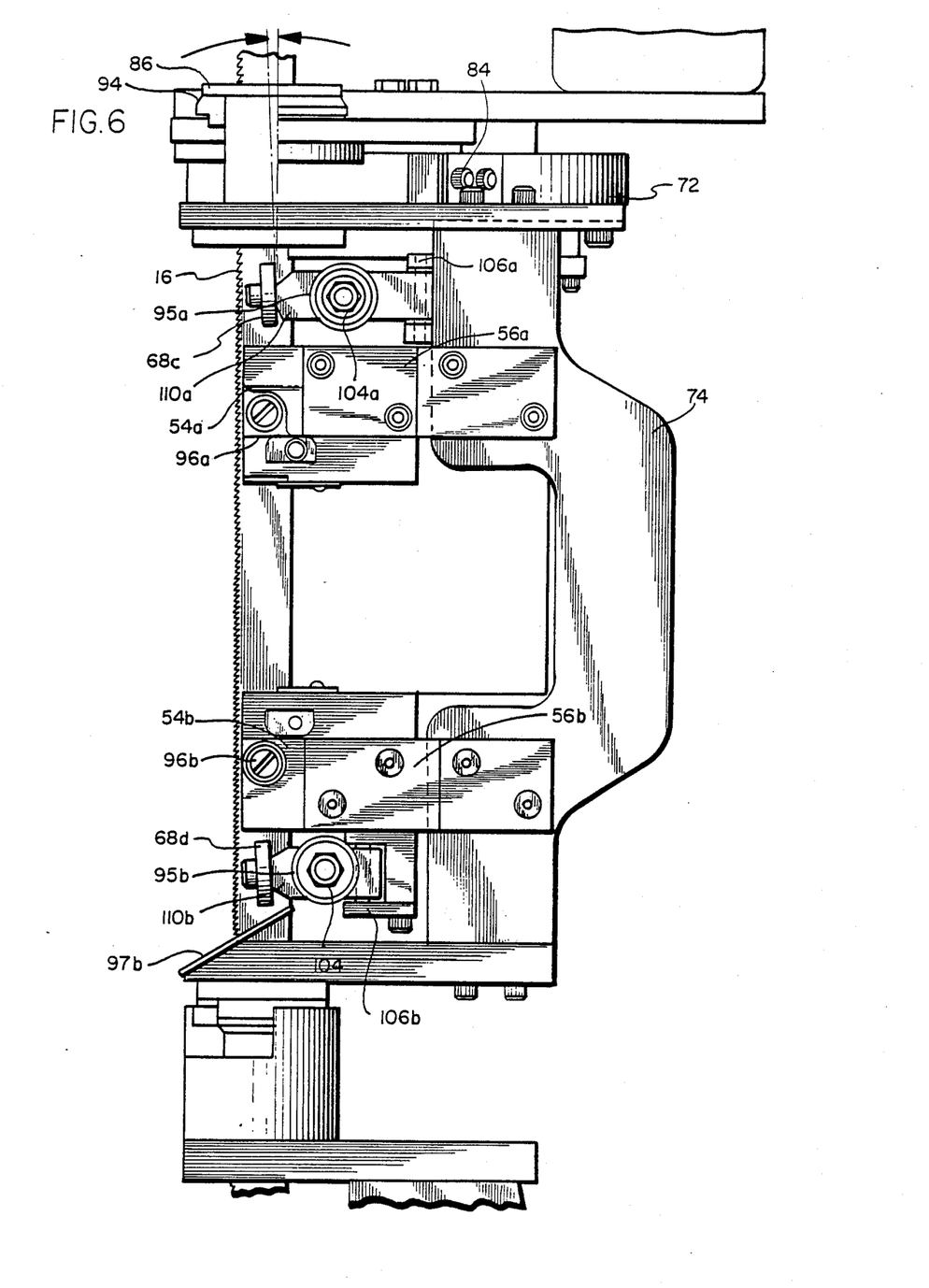
FIG. 6 is a cross-sectional view of the blade positioning apparatus taken along lines 6—6 of FIG. 4.

Another view of the entire blade positioning apparatus is shown in FIG. 6. The tension screws 96a, 96b control the amount of load which the upper blade guide 54a and lower blade guide 54b exert on the saw blade 16 so as to keep it in alignment. The spring load screw assemblies 95a, 95b control the load which the canted rollers 68c, 68d place on the saw blade. These external loads resist the forces exerted on the saw blade in both the lateral and the forward and backward directions when cuts or partial cuts are made to the bar stock 22.

Figure 7:
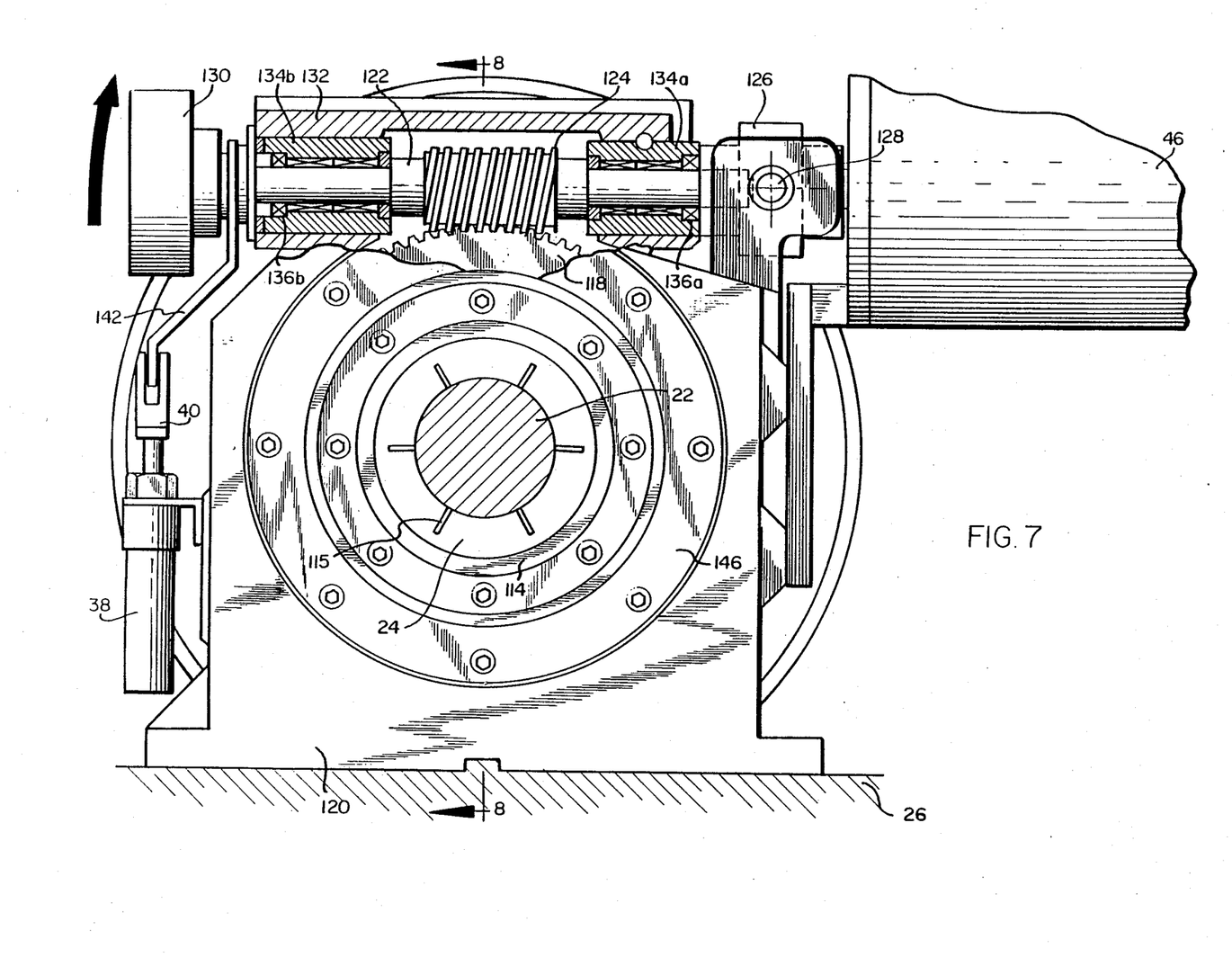
FIG. 7 is an end view in elevation of the collet and associated apparatus partially in sections.

FIG. 7 illustrates the operation of the collet 24. A collet housing 114 surrounds collet 24. Positioned rearward of the collet housing 114 is a worm gear housing 116 within which is a generally circular worm gear 118. A gear box housing cover 120 retains lubricant in worm gear housing 116. A series of slots 115 are provided in the collet 24 to grip the bar stock 22 in a manner well known in the art.

A shaft assembly 122 is connected to the bar rotation servo motor 46 which in turn is under the direction of the computer control 21. A worm 124 having threads which intermesh with the worm gear 118 is formed on the shaft assembly 122. A flexible coupling 126 is mounted on the shaft assembly 122. A fly wheel 130 is mounted to the end of the shaft assembly 122 at the end opposite the bar rotational servo motor 46. A pair of bearing assemblies 134a, 134b are positioned on the worm shaft assembly 122 on either side of the worm 124. Oil seals 136a, 136b, are positioned within bearing assemblies 134a, 134b to retain proper lubrication. A bracket 132, mounted to the worm gear housing 116, secures the worm shaft 122 and the bearings 134a, 134b. Bracket 132 is hinged by means of a pivot 128.

An air cylinder 138, mounted to the gear box housing 116, has a piston rod 140 extending therefrom. A connecting arm 142 is connected at one end to the worm shaft assembly 122 and at the other end to the piston rod 140.

The collet 24 operates in the following manner. When rotation of the bar stock 22 is desired, the rotational servo motor is engaged by the computer control 21, resulting in the rotation of the worm gear shaft assembly 122 and the worm 124. The threads of the worm gear 124 intermesh with the teeth of the worm gear 118 which in turn will result in the rotation of the collet 24. The rotation of the collet 24, clamped around the bar stock 22, causes the bar stock 22 to be rotated to the desired position. The air cylinder 138 acts to pull the shaft assembly 122 and the worm 124 downwardly into the teeth of the worm gear 118. This counteracts the upward force directed on the shaft assembly 122 as a result of the rotational movement about the pivot 128. The air cylinder 138 thus insures a smooth intermeshing between the worm 124 and the worm gear 118, and furthermore removes any gap or clearance between the worm gear teeth and worm teeth, thus improving the accuracy of the angular or rotational position of the bar and reducing vibration of the bar while cutting.

Figure 8:
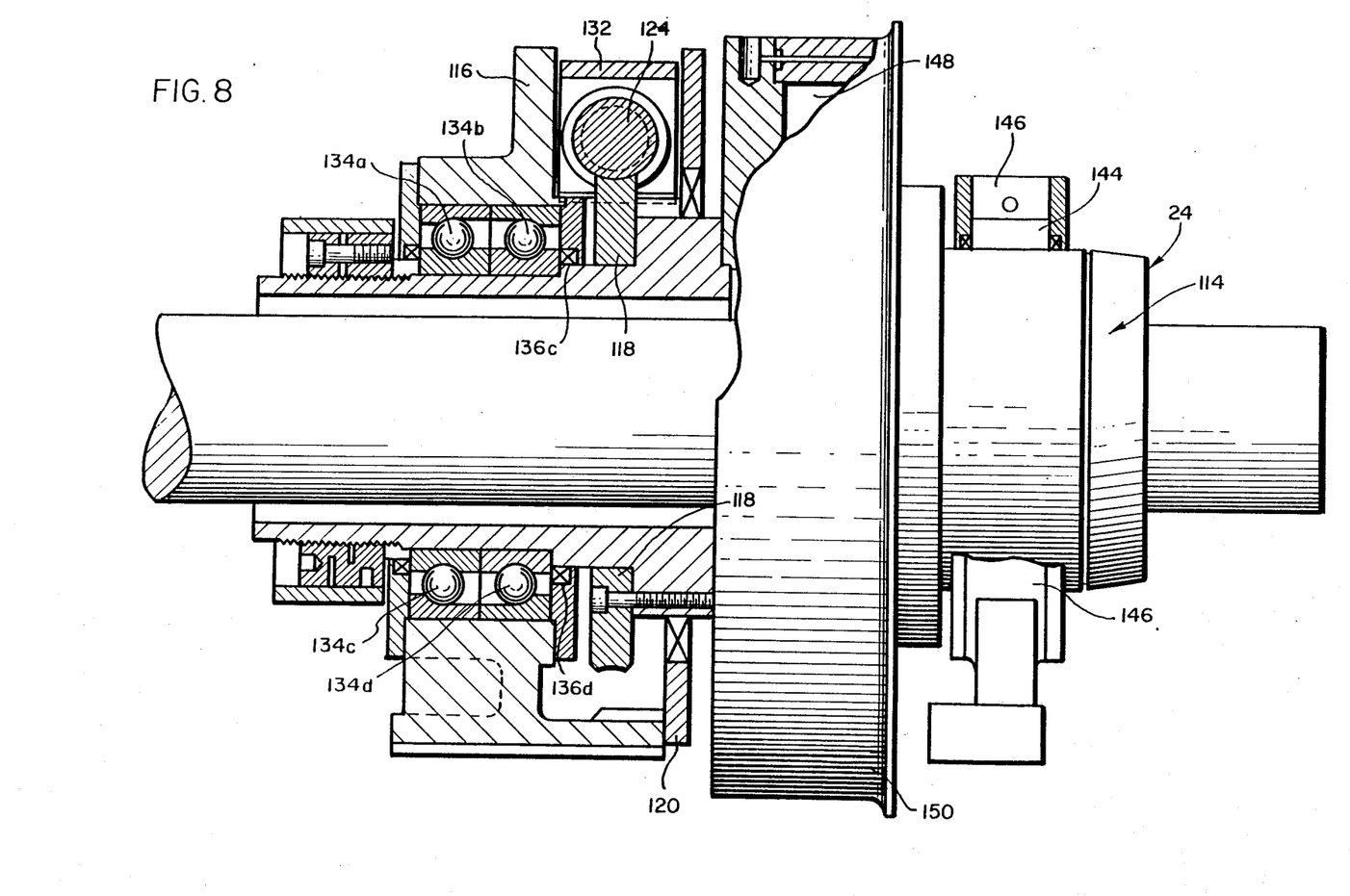
FIG. 8 is a cross-sectional view of the collet and associated apparatus taken along lines 8—8 of FIG. 7.

FIG. 8 shows another perspective of the collet assembly. A needle bearing 144, supports the collet housing 114 by means of bearing support member 146 and is used to support the collet 24 and to resist the downward sawing force of the saw blade 16 when cutting the bar stock 22. The collet 24 is opened and closed by means of a piston operation well known in the art. A piston assembly is positioned within a housing 150 and operates as follows. An air hose, positioned on the outer peripheral surface of the collet piston housing 150, will furnish air to either side of the collet piston to either open or close the collet 24 as desired.

Figure 9:
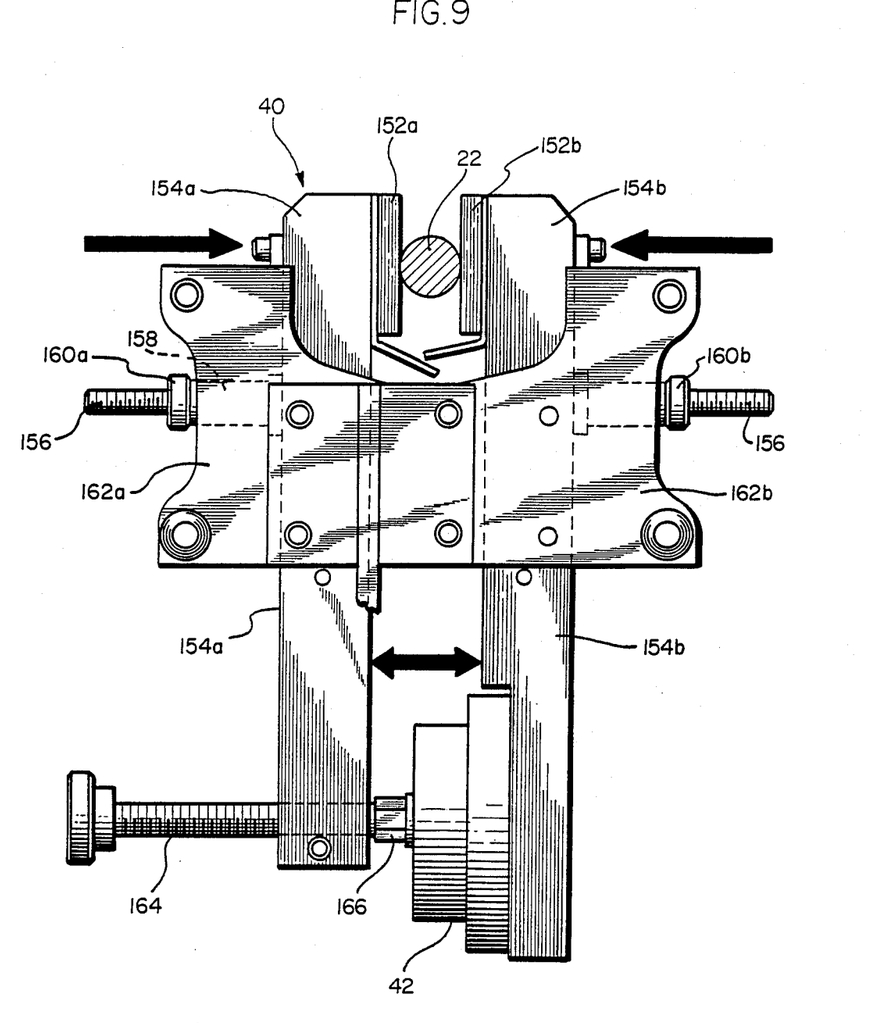
FIGS. 9 and 10 are end views in elevation of the index vise and associated apparatus with different sizes of bar stock.
Figure 10:
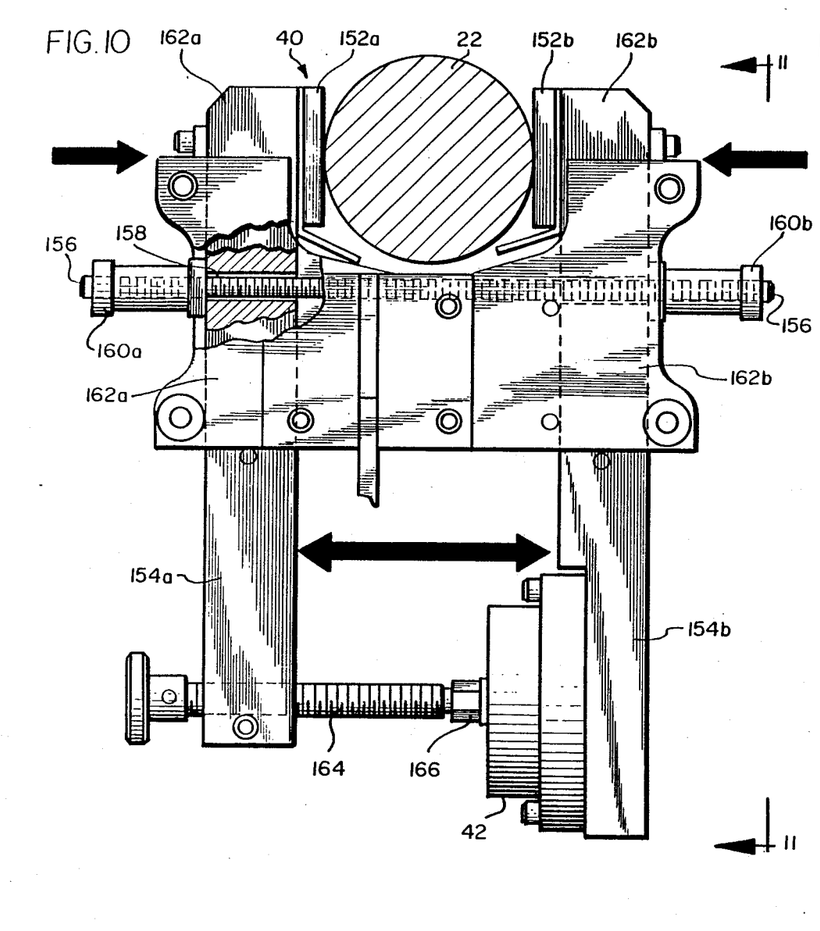

FIGS. 9 and 10 illustrate the operation of the index vise 40. In FIG. 9, the bar stock 22 is of relatively narrow diameter. The bar stock 22 is held in position by a pair of hardened jaws 152a, 152b. The jaws 152a, 152b, are mounted to a pair of movable index vise arms 154a, 154b. The arms 154a, 154b may be moved along a threaded rod 156, covered by a sleeve 158, so as to accommodate the width of the bar stock 22 being used.

Once the desired width is achieved and the bar stock 22 is held in place, further movement of the arms 154a, 154b is prevented by means of adjusting nuts 160a, 160b which are tightened until they are snug. The arms 154a, 154b are sandwiched between a pair of flat inwardly biased plates 162a, 162b. The plates 162a, 162b act to remove any looseness in the movement of the stock in indexing. Any looseness will affect the accuracy of the length of cut being made.

The air cylinder 42 is mounted to index arm 154b. Vise adjusting screw 164 is journaled through index vise arm 154a and abuts against a piston 166 in the air cylinder 42. The position of index vise arm 154a may be adjusted by turning vise screw 164 until the desired position is reached to accommodate the particular diameter of the bar stock 22. In accommodating the width of a particular piece of bar stock 22, index vise arms 154a, 154b are moved along the threaded rod 156 and the shaft of vise screw 164 simultaneously.

When the air cylinder 42 is engaged by the computer control 21, the lower portions of the vise arms 154a, 154b move apart and the upper arms move toward one another, with the movement limited by the bar stock 22 inserted between jaws 152a, 152b. In this situation, there will be no rotation nor longitudinal movement of the bar stock. The air cylinder typically disengages when cuts are to be made on the bar stock 22. When rotation and/or longitudinal movement of the bar stock 22 is desired, the collet 24 is closed and the air cylinder 42 is disengaged. The lower portion of the vise arms 154a, 154b then move toward one another so that the vise jaws 152a and 152b move generally away from bar stock 22. This position of the index vise 40 will permit either the rotational or longitudinal movement of the bar stock 22.

FIG. 10 shows the positioning of the index vise arms 154a, 154b when a large piece of bar stock 22 is inserted between them. The positioning, adjustment and movement of the index vise 40 is the same as that described for FIG. 9.

Figure 11:
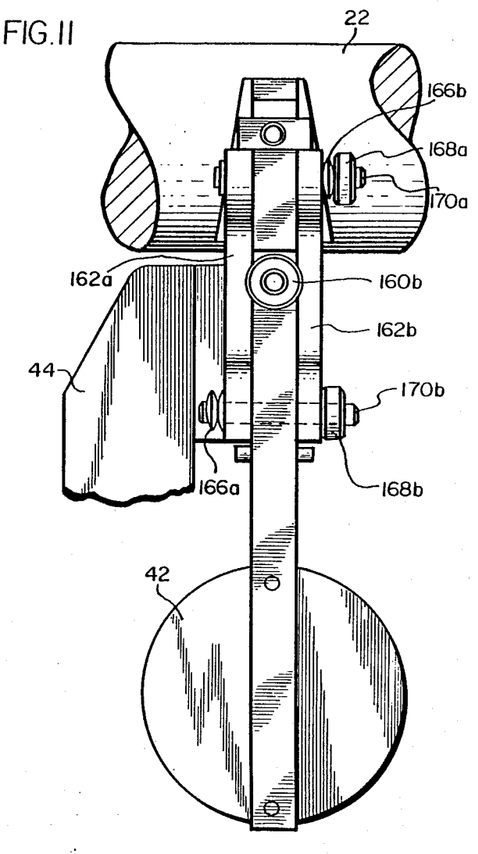
FIG. 11 is a cross-sectional view of the index vise taken along lines 11—11 of FIG. 10.
Figure 12:
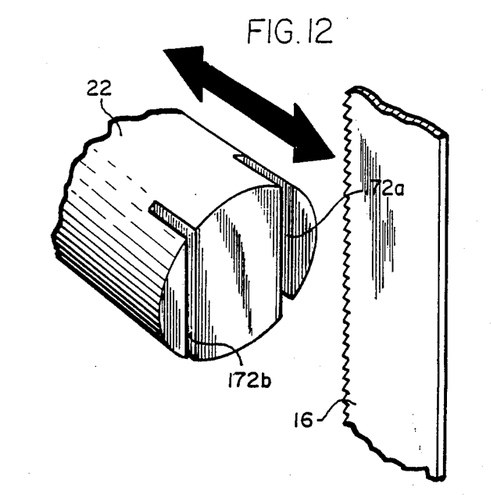
FIGS. 12-16 are schematic views of bar stock being cut in accordance with the present invention.

FIG. 11 illustrates the biased arrangement of flat plates 162a, 162b. A pair of springs 166a, 166b abut against flat plates 162a, 162b. Adjusting washers 168a, 168b are journaled on a pair of shafts 170a, 170b and may be tightened to sufficient degree such that the springs 166a, 166b exert a force against flat plates 162a, 162b to remove any excess "play" in the longitudinal directional movement of the bar stock 22. This apparatus provides the means for accurate indexing of the bar stock 22.

FIGS. 12-16 illustrate a typical cutting operation which may be performed by the present invention. The saw blade 16 is oriented generally parallel to the longitudinal axis of the bar stock 22. The Y-axis servo motor 28 is engaged and the bar stock 22 is moved longitudinally in the direction of the saw blade. Cuts 172a, 172b are made by moving the bar stock 22, into the saw blade to the desired depth. After the first cut 172a is made, the saw blade is withdrawn and moved horizontally until it is positioned to make cut 172b. The saw blade is then engaged and cut 172b is made to the desired depth.

Figure 13:
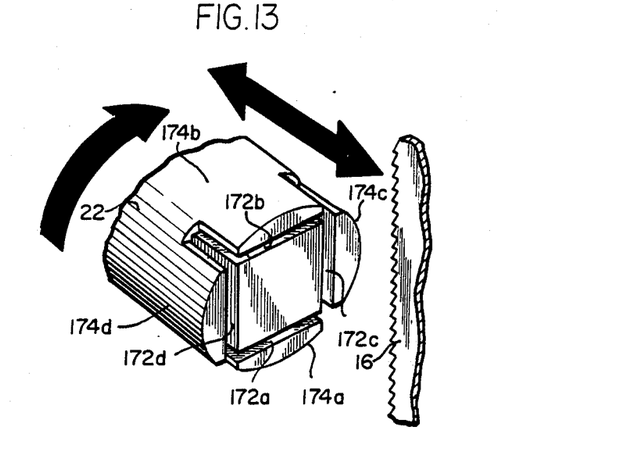

FIG. 13 illustrates the movement of the bar stock 16 in order to perform two more cuts 172c, 172d generally perpendicular to cuts 172a, 172b. The bar stock 16 is rotated by engaging the rotational servo motor 46, under the direction of the computer control 21. The bar stock is rotated 90°. The same procedure is then followed as described for making cuts 172a, 172b.

Figures 14, 15, 16, 17, 18:
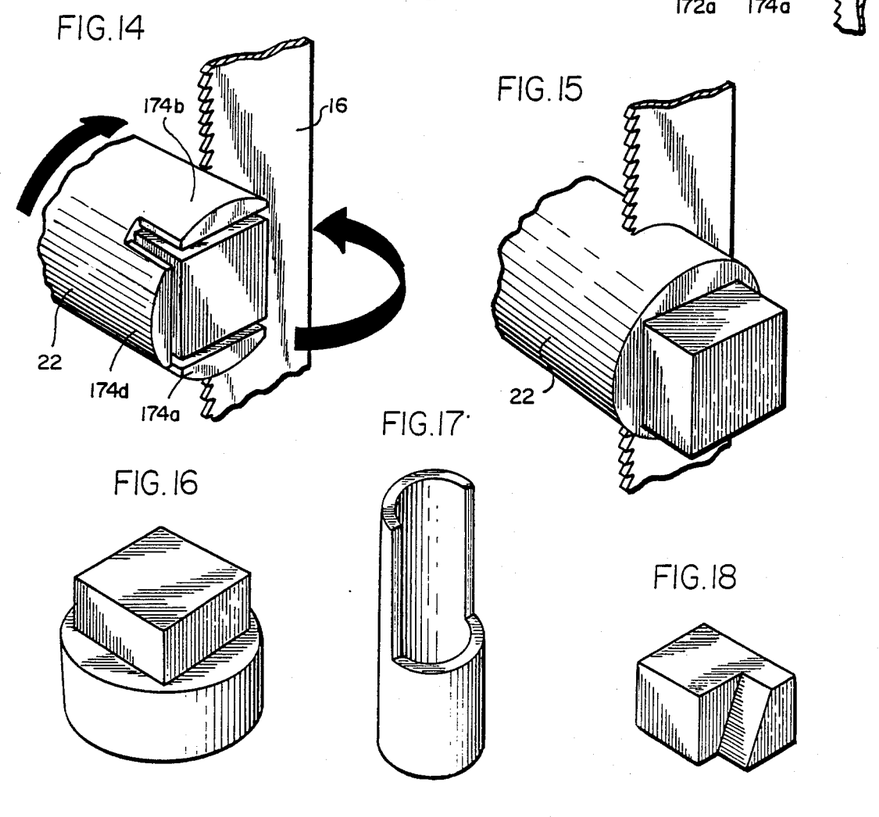
FIGS. 17-18 are schematic views of bar stock material cut in accordance with the present invention.

FIG. 14 illustrates the method of cutting selected sections of the bar stock 22. The band saw blade is rotated 90° so that its orientation is generally perpendicular to the longitudinal axis of the bar stock 22. The band saw 16 is moved to a position so that its distance from the front of the bar stock 22 is generally identical to the depth of the cuts 172a, 172b, 172c, 172d made previously. The band saw blade 16 is then moved into the bar stock and horizontal cuts are made to a desired depth until desired sections 174a, 174b, 174c, 174d are removed. After the section 174c is removed, the bar stock is rotated 90° and a second generally perpendicular cut is made to remove the section 174b. This process is repeated two more times until all of the desired sections are removed.

FIG. 15 next shows the band saw blade 16 making a complete cut through the bar stock material 22. The bar stock 22 has been indexed forward so that the desired length is reached for the finished piece. The band saw blade then makes a complete cut through the bar stock 22.

FIG. 16 shows the completed work piece. The piece is characterized by smooth finished surfaces on all four cut sides of the bar stock 22.

FIGS. 17 and 18 show alternate cuts which can be made on bar stock material using the present invention. The cut in FIG. 17 is made by first making a cut generally along the longitudinal center line of the bar stock material 22. The band saw blade 16 is then removed and repositioned generally perpendicular to the longitudinal axis of the bar stock 22. A cut is then made which is perpendicular to the cut previously made in the bar stock 22 to a depth of approximately the radius of the bar stock 22.

FIG. 18 illustrates another possible piece part which could be cut from square or rectangular bar stock. As can be seen, both angular cuts and square cuts can be made on the bar stock material using the computer control to coordinate the indexing and rotation of the bar stock 22 as well as the band saw 16.

It is evident that the operation as well as the specific band saw design may be modified within the idea of this invention, and that further variations are possible in the scope of the appended claims.

I claim:

1. A band saw machine capable of making a plurality of saw cuts at any selected portion and to any selected depth along the entire length of a piece of bar stock comprising:
   a band saw blade assembly having a saw blade and driving wheels mounted to a frame to permit movement of the band saw blade assembly in a direction generally perpendicular to the longitudinal axis of the bar stock;
   a servo motor connected to the band saw blade assembly to provide movement to the band saw blade assembly in a direction generally perpendicular to the longitudinal axis of the bar stock;
   a collet assembly comprising a rotatable collet connected to a gear assembly and a servo motor to enable the collet to rotate the piece of bar stock up to 360 degrees;
   a bearing assembly comprising linear bearings and a servo motor connected to the collet assembly to provide movement to the collet assembly and bar stock in a direction generally parallel to the longitudinal axis of the bar stock;
   an index vise assembly for moving the bar stock longitudinally through the collet in a direction generally parallel to the longitudinal axis of the bar stock;
   a saw blade twist assembly for twisting the saw blade through an arc of generally 90 degrees; and
   an automated control means connected to all servo motors for coordinating the movements of the band saw blade and the bar stock to enable the band saw blade to make selected cuts to any selected depth along any selected portion of the entire length of the piece of bar stock.

2. A band saw blade assembly according to claim 1 having linear bearings connected to the frame of the band saw blade assembly to guide the band saw blade assembly in a direction generally perpendicular to the longitudinal axis of the bar stock.

3. The band saw machine according to claim 2 wherein canted rollers are placed adjacent to the linear bearings guiding the band saw blade assembly and exert a generally continuous predetermined force against the sides of the saw blade.

4. A band saw machine according to claim 1 in which the automated control means comprises a preprogrammed computer control means capable of being programmed to produce the required combination of cut positions, angles, lengths of cuts, and bar stock rotational positions for repetitious production of finished or semi-finished piece parts without human intervention.

5. The band saw machine according to claim 1 in which the gear assembly used to rotate the collet assembly comprises a worm and worm gear.

6. The band saw machine of claim 1 in which the saw blade twist assembly has a blade twisting means supported by journal bearings having their rotational axis coincident with the longitudinal axis of the saw blade, a servo motor and tooth belt connected to the blade twisting means, and canted rollers fastened to the blade twisting means to prevent lateral movement of the saw blade while removing the saw blade from the bar stock after a partial cut has been completed.

7. The band saw machine according to claim 6 in which the canted rollers place a force on each side of the saw blade by means of spring loaded assemblies.

8. A band saw machine capable of making repeated straight, angular, and arcuate cuts in selected portions of piece parts, comprising:
   a continuous band saw blade positioned on a pair of rotating wheels mounted to the band saw machine which is connected to X and Y axis servo motors;
   a collet assembly mounted to the band saw machine and connected to a servo motor;
   an index vise assembly mounted to the band saw machine;
   a band saw blade twist assembly mounted to the band saw machine and connected to a servo motor;
   a canted roller assembly mounted to the band saw blade twist assembly to maintain the band saw blade in a generally fixed position when cuts are being made; and
   a programmed computer control means connected to the band saw blade servo motors, the collet assembly servo motor, the index vise assembly, and the band saw blade twist assembly servo motor;
   so that the computer control means can determine the position of the piece part and the saw blade so as to produced finished or semi-finished pieces of various configurations, using both through cuts and partial cuts while maintaining the band saw blade in its desired position when the saw blade is being withdrawn.

* * * * *

UNITED STATES PATENT AND TRADEMARK OFFICE
CERTIFICATE OF CORRECTION

PATENT NO. : 4,926,728

DATED : May 22, 1990

INVENTOR(S) : James Kawabata

It is certified that error appears in the above-identified patent and that said Letters Patent is hereby corrected as shown below:

Column 2, line 32, after "two", insert --pairs of--;

Column 2, line 52, delete "have" and insert --provide--;

Column 2, line 53, delete "horizontally" and insert --perpendicular--;

Column 2, line 56, delete "have" and insert --provide--

Column 2, line 65, after "invention", insert --is--;

Column 3, line 4, before "operating", insert --of--;

Column 3, line 60, delete "pre-programmed" and insert --programmable--;

Column 3, line 64, delete "pre-programmed" and insert --programmable--;

Column 4, line 29, delete "in the direction of" and insert --along the y-axis--;

Column 4, line 30, delete "the saw blade";

Column 5, line 11, delete "of" and insert --to--;

Column 9, line 9, delete "horizontal";

Column 10, line 21, delete "prepro-" and insert --programmable--;

Column 10, line 22, delete "grammed"; and

UNITED STATES PATENT AND TRADEMARK OFFICE
CERTIFICATE OF CORRECTION

PATENT NO. : 4,926,728

DATED : May 22, 1990

INVENTOR(S) : James Kawabata

It is certified that error appears in the above-identified patent and that said Letters Patent is hereby corrected as shown below:

Column 10, line 57, delete "programmed" and insert --programmable--.

Signed and Sealed this

Seventeenth Day of September, 1991

Attest:

HARRY F. MANBECK, JR.

Attesting Officer

Commissioner of Patents and Trademarks